US 6,568,746 B2

(12) United States Patent
Sakyo et al.

(10) Patent No.: US 6,568,746 B2
(45) Date of Patent: May 27, 2003

(54) CAB FOR CONSTRUCTION MACHINERY

(75) Inventors: Tsuyoshi Sakyo, Shimoinayoshi (JP); Kazunori Komatsu, Shimoinayoshi (JP); Katsuhiro Satou, Yamato (JP)

(73) Assignees: Hitachi Construction Machinery Co., Ltd., Tokyo (JP); Press Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 10/110,389

(22) PCT Filed: Sep. 13, 2001

(86) PCT No.: PCT/JP01/07964
§ 371 (c)(1),
(2), (4) Date: Apr. 12, 2002

(87) PCT Pub. No.: WO02/22968
PCT Pub. Date: Mar. 21, 2002

(65) Prior Publication Data
US 2002/0149232 A1 Oct. 17, 2002

(30) Foreign Application Priority Data
Sep. 18, 2000 (JP) ......................................... 2000-282393

(51) Int. Cl.⁷ .............................. E02F 9/16; B66C 13/54
(52) U.S. Cl. ............................ 296/190.08; 296/203.01; 180/89.12
(58) Field of Search ....................... 296/190.01, 190.08, 296/203.01, 190.05; 180/89.12, 89.13, 89.14, 89.17, 89.18, 89.19

(56) References Cited

U.S. PATENT DOCUMENTS

| 2,565,919 | A | * | 8/1951 | Hill ........................ 296/190.05 |
| 4,023,851 | A | * | 5/1977 | Palmer et al. ......... 296/190.08 |
| 4,061,392 | A | * | 12/1977 | Lowder et al. ......... 296/190.03 |
| 4,304,142 | A | * | 12/1981 | Blomstrom ................. 74/105 |
| 4,440,437 | A | * | 4/1984 | Hahm et al. ............ 296/190.05 |
| 4,650,242 | A | * | 3/1987 | Obe et al. ............... 296/190.08 |
| 4,772,065 | A | * | 9/1988 | Nakata et al. ............... 264/279 |
| 6,149,228 | A | * | 11/2000 | O'Neill et al. ......... 296/190.03 |
| 6,244,369 | B1 | * | 6/2001 | Yunoue et al. ........... 180/89.12 |
| 6,357,820 | B1 | * | 3/2002 | Nagatsuka et al. .... 296/190.06 |
| 2002/0030397 | A1 | * | 3/2002 | Tamura et al. ............ 298/17 R |
| 2002/0153748 | A1 | * | 10/2002 | Sakyo et al. ............ 296/190.08 |

FOREIGN PATENT DOCUMENTS

| JP | 59-102657 | 7/1984 |
| JP | 5-61246 | 8/1993 |
| JP | 8-260518 | 10/1996 |
| JP | 11-166247 | 6/1999 |
| JP | 2000-198469 | 7/2000 |
| JP | 2000-234352 | 8/2000 |

* cited by examiner

Primary Examiner—D. Glenn Dayoan
Assistant Examiner—Patricia L. Engle
(74) Attorney, Agent, or Firm—Mattingly, Stanger & Malur, P.C.

(57) ABSTRACT

A cab for construction machines includes left and right rear pillars constituted by steel pipes of a diversified shape, with inclined intermediate pillar portions between upright lower pillar portions and upper pillar portions whereby positions of the lower and upper pillar portions are shifted in the forward and rearward directions, respectively. Lower portions of the rear pillars are receded in the forward direction to provide a recessed space, while upper portions of the rear pillars are projected out in the rearward direction to provide a rear expansion space. Accordingly, for the purpose of downsizing the upper structure (2), front portions of equipment, including an engine, can be accommodated in the recessed space and the rear expansion space contributes to broaden a space within the cab.

6 Claims, 13 Drawing Sheets

CAB FOR CONSTRUCTION MACHINERY

TECHNICAL FIELD

This invention relates to a cab for construction machines, which can be suitably applied, for example, to hydraulic excavators, hydraulic cranes and the like.

BACKGROUND ART

Generally, construction machines such as hydraulic excavators, for example, are largely constituted by a lower structure, an upper structure which is rotatably mounted on the lower structure, and a working mechanism which is provided on a front portion of the upper structure for lifting loads up and down. A cab is provided on a revolving frame of the upper structure as an operating room to be occupied by an operator at the control of the machine.

The cabs of hydraulic excavators of this sort are usually formed in a box-like shape, from a standpoint of protecting the operators. As for an example of such cabs for hydraulic excavators, there has been known a cab box construction having mount bases located at four corners of the cab box, base link frames connecting adjacent mount bases to each other in transverse and longitudinal directions of the machine, right and left front pillars erected on right front and left front mount bases, right and left rear pillars erected on right and left rear mount bases, right and left roof pillars connecting upper end portions of the front and rear pillars, a front tie frame connecting upper end portions of right and left front pillars, and a rear tie frame connecting upper end portions of right and left rear pillars (e.g., as disclosed in Japanese Laid-Open Patent Publication No. 2000-198469).

Among hydraulic excavators of various types, those machines which are relatively small in size are usually provided with an upper structure which is reduced in width and length, particularly in length from a front end of a cab to a rear end of a counterweight in order to minimize the radius of revolving of the upper structure for the sake of ensuring higher working efficiency.

However, in addition to a space for a cab, the upper structure of a hydraulic excavator is normally required to have a broad space for mounting various equipments such as engine, heat exchanger, fuel tank, operating oil tank and a group of control valves, and the cab itself is required to have a broad space for installation of various instruments and devices in addition to a dwelling room for an operator. In this regard, with the cab construction as disclosed in the above-mentioned Japanese Laid-Open Patent Publication No. 2000-198469, it is difficult to downsize the upper structure.

In this connection, there have been known hydraulic excavators with a cab which is so arranged as to permit downsizing of an upper structure. Prior art hydraulic excavators with a cab of this sort are described, for example, in Japanese Laid-Open Utility Model Publication No. H5-61246 and S59-102657.

In the case of the prior art cabs in the patent and utility model publications just mentioned, a recess is provided at the back side of a cab box in order to accommodate part of an engine and other equipments therein, and a cab is located in a receded position for the purpose of reducing the size of an upper structure.

Further, in the case of the prior art construction machine cabs disclosed in the above-mentioned Japanese Laid-Open Utility Model Publication No. H5-61246 and S59-102657, rear pillars are bent in a crank-like shape in order to provide a recess at the back side of the cab, making the rear pillars complicate in shape. Therefore, rear pillars of a hollow structure have to be fabricated, for example, by joining and welding inner and outer panel members to each other after pressing the respective panel members to a predetermined shape on a press.

More specifically, the complication in shape of pillars or other structural members, resulting from the provision of a recessed portion in a cab box, makes it necessary to make a plural number of panel members from sheet material by the use of complicate dies and then to fabricate pillars of hollow structures by joining and welding the shaped panel members in an intricate manner. Needless to say, complication of the fabrication process is reflected by lower productivity and higher cost.

DISCLOSURE OF THE INVENTION

In view of the above-discussed problems with the prior art, it is an object of the present invention to provide a cab for a construction machine, which can be fabricated easily at low cost, including fabrication of rear pillars, despite provision of an expanded machine room on the back side of the cab, permitting to improve productivity and at the same time to cut production cost of the cab.

More specifically, the present invention is directed to a cab for construction machines which includes: mount bases located at four corners; base link frames arranged to connect said mount bases in transverse and longitudinal directions of the machine; left and right front pillars erected on left front and right front mount bases; left and right rear pillars erected on left rear and right rear mount bases; left and right roof pillars disposed in the longitudinal direction and bridged between upper end portions of the left and right front pillars and the left and right rear pillars, respectively; a front tie frame bridged between upper end portions of the left and right front pillars to connect same in the transverse direction; and a rear tie frame bridged between upper end portions of the left and right rear pillars to connect same in the transverse direction.

According to the present invention, in order to solve the above-mentioned problems, there is provided a cab for construction machines, which is characterized in that: the left and right rear pillars are each constituted by a hollow steel pipe of a staggered shape with an inclined intermediate pillar portion between upright lower and upper pillar portions to have positions of the lower and upper pillar portions shifted in the forward and rearward directions, respectively; a recessed space is provided on the lower side of the intermediate pillar portions of the left and right rear pillars to expand an external machine room; and a rear expansion space is provided on the upper side of the intermediate pillar portions of the left and right rear pillars to expand an internal dwelling room of the cab.

With the arrangements just described, the rear pillars of complicate shape, having positions of lower and upper pillar portions staggered in forward and rearward directions, can be fabricated simply by forming bends in an intermediate portion of a hollow steel pipe. A recessed space is provided on the lower side of the rear pillars for the purpose of expanding an external machine room, while a rear expansion space is provided on the upper side of the rear pillars to expand a dwelling room within the cab.

According to a preferred form of the present invention, the left and right pillars are each constituted by a lower pillar portion erected on one of rear mount bases, an intermediate pillar portion inclined rearward from upper end of the lower pillar portion, and an upper pillar portion extended upright from upper end of the intermediate pillar portion, the lower, intermediate and upper portions being formed by bending a hollow steel pipe.

With the arrangements just described, the rear pillars of a complicate shape can be fabricated easily by the use of a hollow steel pipe, bending an upper end of the lower pillar portion in the rearward direction and then bending an upper end of the intermediate pillar portion in the forward direction.

According to another preferred form of the present invention, a rear panel is provided between the left and right rear pillars to cover the back side of the cab, the rear panel being formed of a plate shaped in conformity with a staggered profile of the rear pillars.

With the arrangements just described, the rear panel can be attached between the rear pillars easily by welding or other suitable means. When attached in position, the rear panel delimits the fore end of the recessed space along with the rear pillars.

According to still another preferred form of the present invention, the left and right rear pillars are each constituted by a steel pipe of a diversified sectional shape which is obtained by drawing an ordinary round steel pipe.

In this instance, each one of the rear pillars can be constituted by a steel pipe of a diversified sectional shape which is obtained by drawing an ordinary round steel pipe into a specific sectional shape, and bending the steel pipe of a diversified shape into a staggered form. Therefore, the rear pillars can be fabricated very easily even in a case they have a complicate shape in section.

According to a further preferred form of the present invention, a center pillar is provided at one lateral side of the cab and connected to the base link frame and the roof pillar at an intermediate position between front and rear ends of the cab, the center pillar being integrally provided with a side panel portion extending to the rear side in such a way as to cover up the recessed space.

With the arrangements just described, the strength of the base link frame and the roof pillar can be enhanced by the center pillar. Besides, the recessed space can be concealed by the side panel to improve the appearance of the cab.

According to a further preferred form of the present invention, the left and right rear pillars are each provided with a vertically extending window pane fitting protuberance on a transversely inner side for fitting a rear window glass thereon.

With the arrangement just described, rear window glass can be fitted in position very easily by the use of the window pane fitting protuberances which are provided on the left and right rear pillars.

According to a further preferred form of the present invention, a design cover is attached to the back side of the rear panel in such a way as to cover upper side of the recessed space.

With the arrangement just described, the open top side of the recessed space can be covered up by the design cover to improve the appearance of the cab.

BEST MODE FOR CARRYING OUT THE INVENTION

Hereafter, the construction machine cab according to the present invention is described more particularly by way of its preferred embodiments which are applied by way of example to a hydraulic excavator, with reference to the accompanying drawings.

Referring first to FIGS. 1 through 10, there is shown a first embodiment of the present invention. Indicated at 1 is a lower structure of a hydraulic excavator, and at 2 is an upper structure which is rotatably mounted on the lower structure 1. A front working mechanism 3 is provided on a front portion of the upper structure 2, having a working attachment which can be lifted up and down, for example, for an excavating operation.

Figure 1:
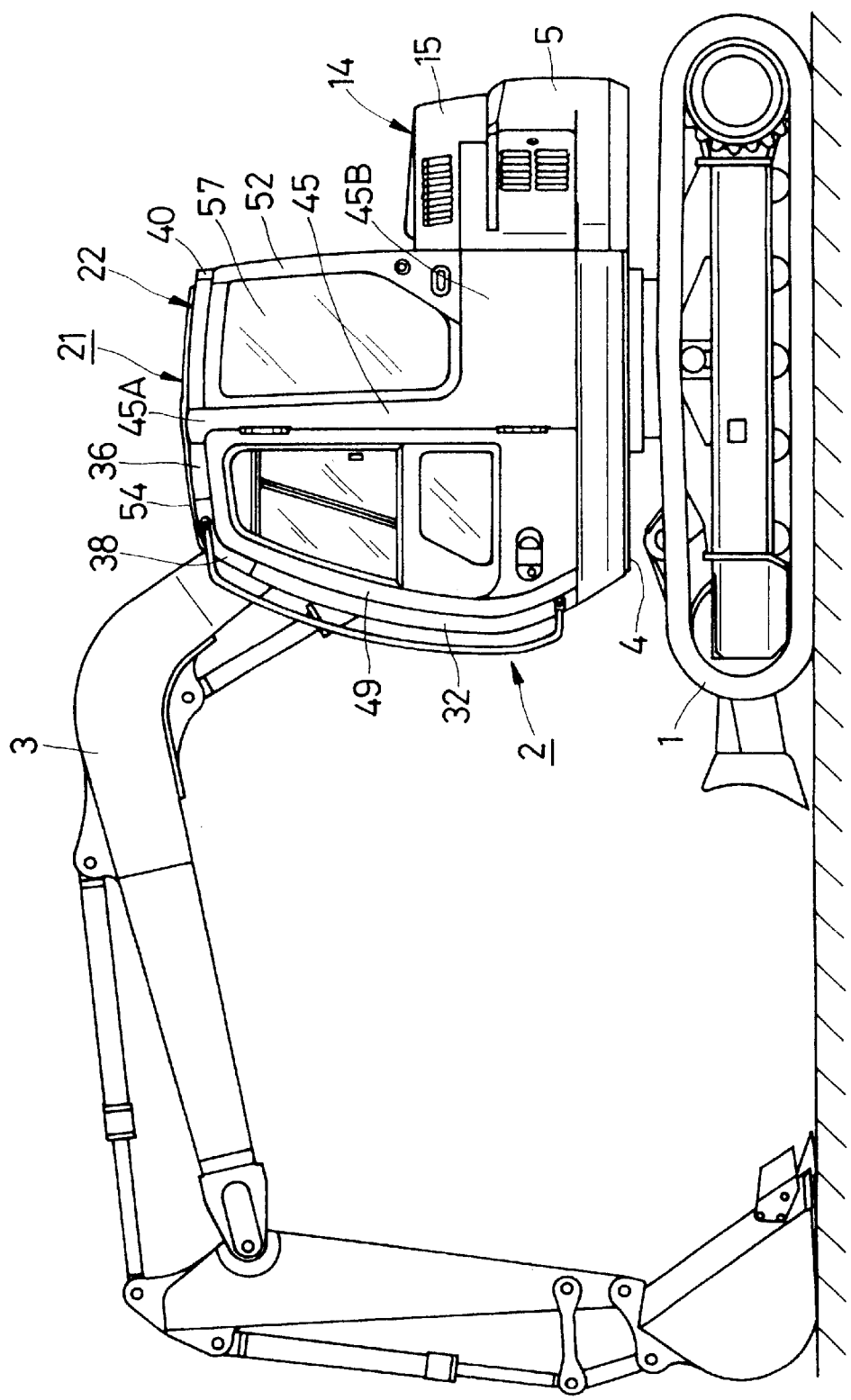
FIG. 1 is a front view of a hydraulic excavator with a cab of a first embodiment according to the present invention.
Figure 2:
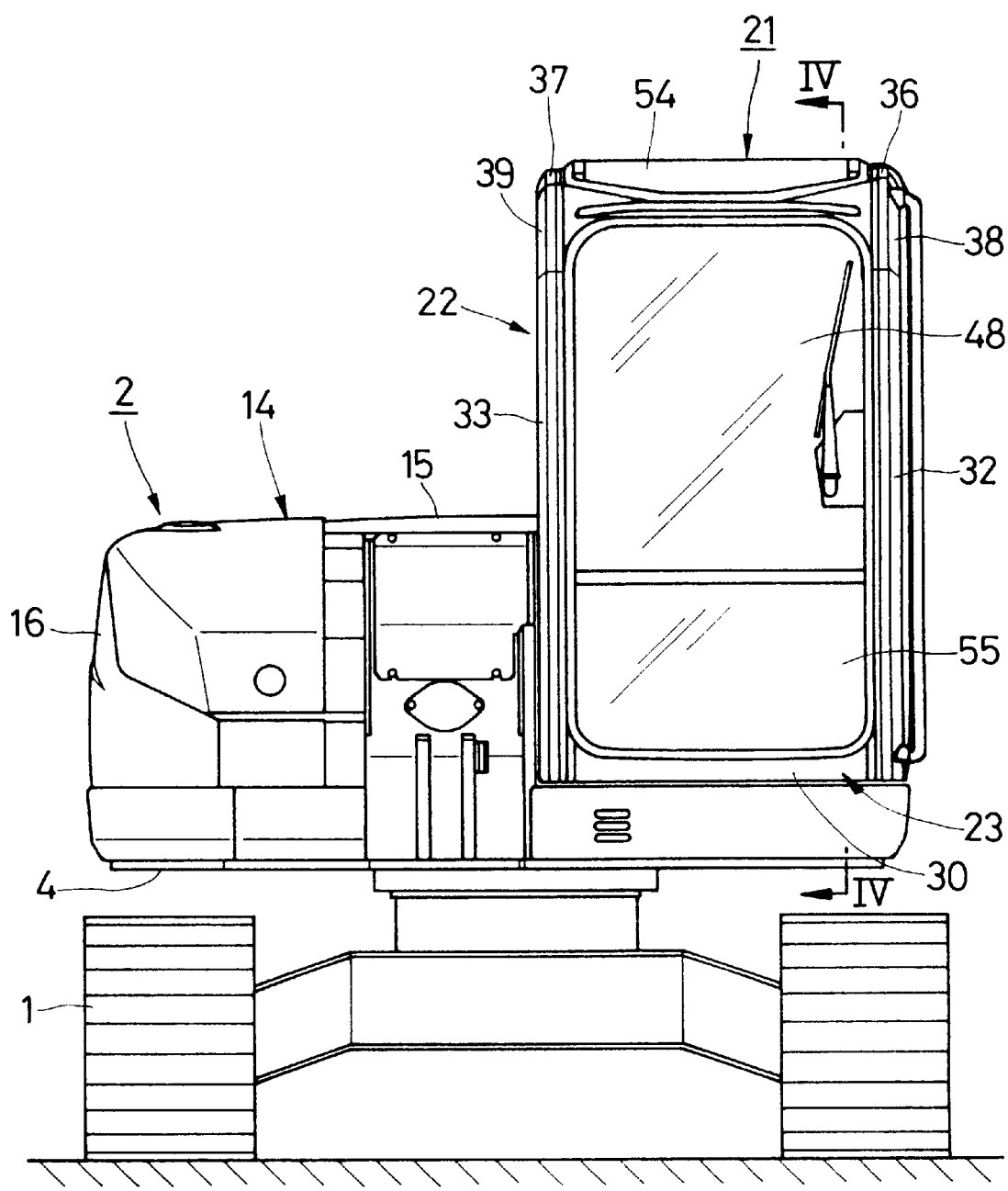
FIG. 2 is an enlarged left side view of the hydraulic excavator, with a front working mechanism omitted therefrom.
Figure 3:
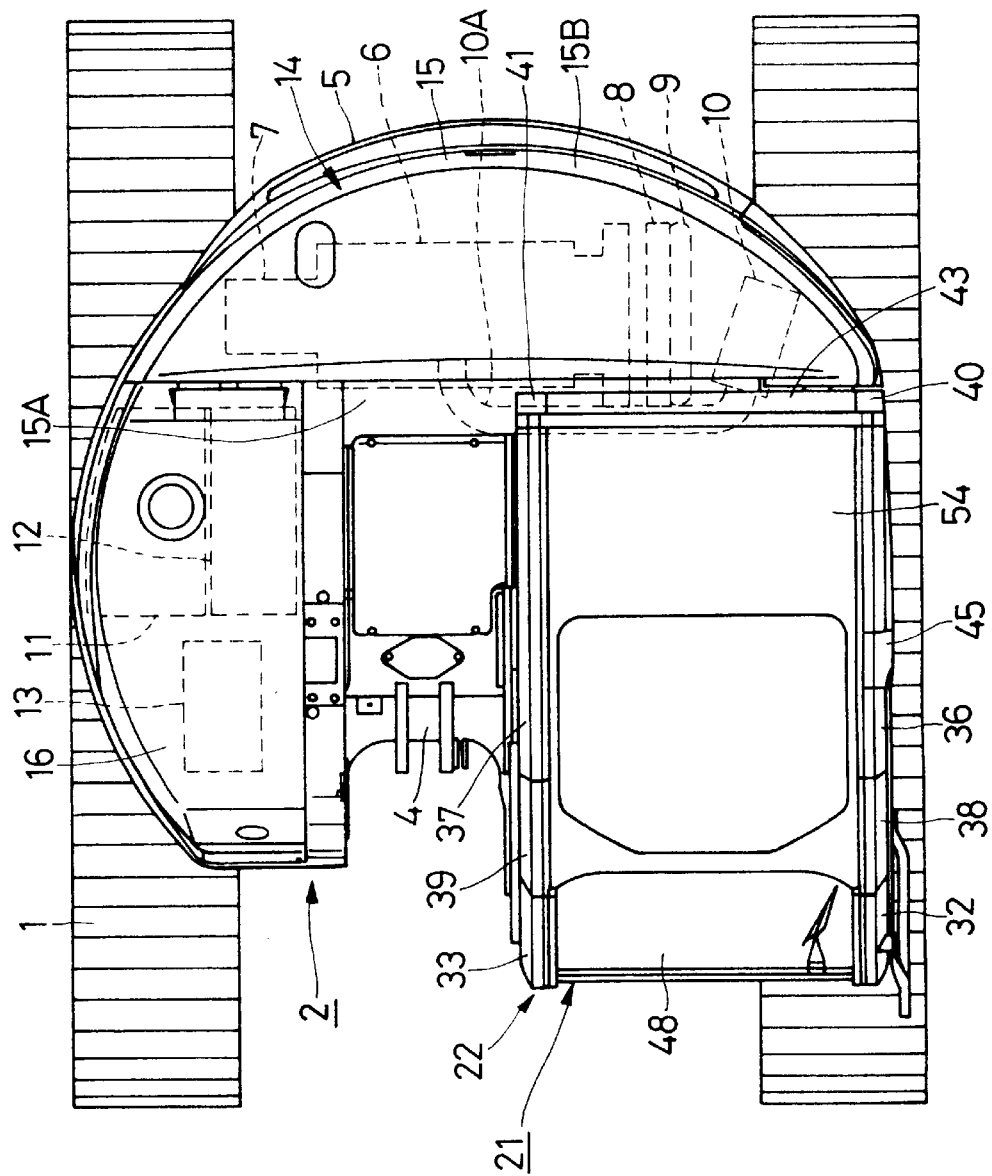
FIG. 3 is a plan view of the hydraulic excavator shown in FIG. 2.

Further, as shown in FIGS. 2 and 3, the upper structure 2 is largely constituted by a revolving frame 4, a cab 21 which is mounted on a left front portion of the revolving frame 4 as will be described in greater detail hereinafter, a counterweight 5 which is attached to a rear end portion of the revolving frame 4, an engine 6 which is transversely mounted on the revolving frame 4 on the rear side of the cab 21, a hydraulic pump 7 which is located on the right side of the engine 6, a radiator 8 and an oil cooler 9 which are provided on the revolving frame 4 in the proximity of the left side of the radiator 8, an air cleaner 10 which is located on the left side of the radiator 8 and connected to an intake side of the engine 6 through an intake hose 10A, a fuel tank 11 and an operating oil tank 12 which are mounted on the revolving frame 4 at positions on the right front side of the engine 6, a group of control valves 13 which are located on the front side of the tanks 11 and 12, and an outer shield cover 14 which is provided on the revolving frame 4 in such a way as to extend from right to rear side of the cab 21 and to define a machine room therein.

In this instance, the outer shield cover 14 is largely constituted by a rear cover section 15 which is arranged to accommodate the engine 6, hydraulic pump 7, radiator 8, oil cooler 9 and air cleaner 10 on the rear side of the cab 21, in cooperation with the counterweight 5, and a right cover section 16 which is provided on the right side of the cab 21 and the front working mechanism 3 and arranged to accommodate the fuel tank 11, operating oil tank 12, and a group of control valves 13.

Figure 4:
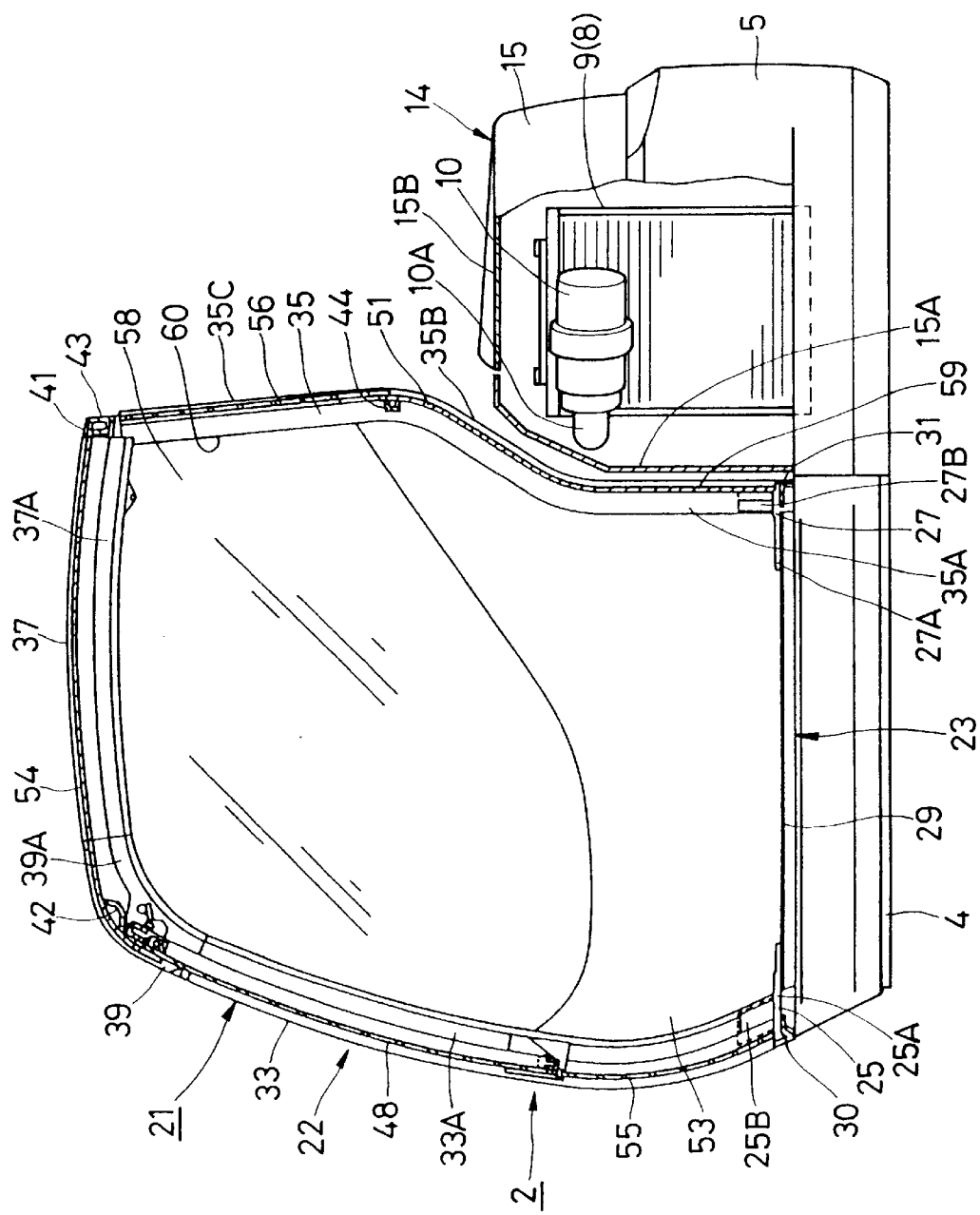
FIG. 4 is a sectional view of a cab and an outer shield cover, taken in the direction of arrows IV—IV of FIG. 2.

As shown in FIG. 4, the rear cover section 15 of the outer shield cover 14 is constituted by a front cover portion 15A which shields the front side of the radiator 8 and the oil cooler 9, and a bonnet portion 15B which can be opened and closed and which is arranged to cover the top and rear sides of the engine 6. Further, the front cover portion 15A is provided with an inclined surface which is inclined rearward correspondingly to inclined intermediate pillar portions 34B and 35B of rear pillars 34 and 35 of the cab 21 (FIG. 4), which will be described in greater detail hereinafter.

Figure 5:
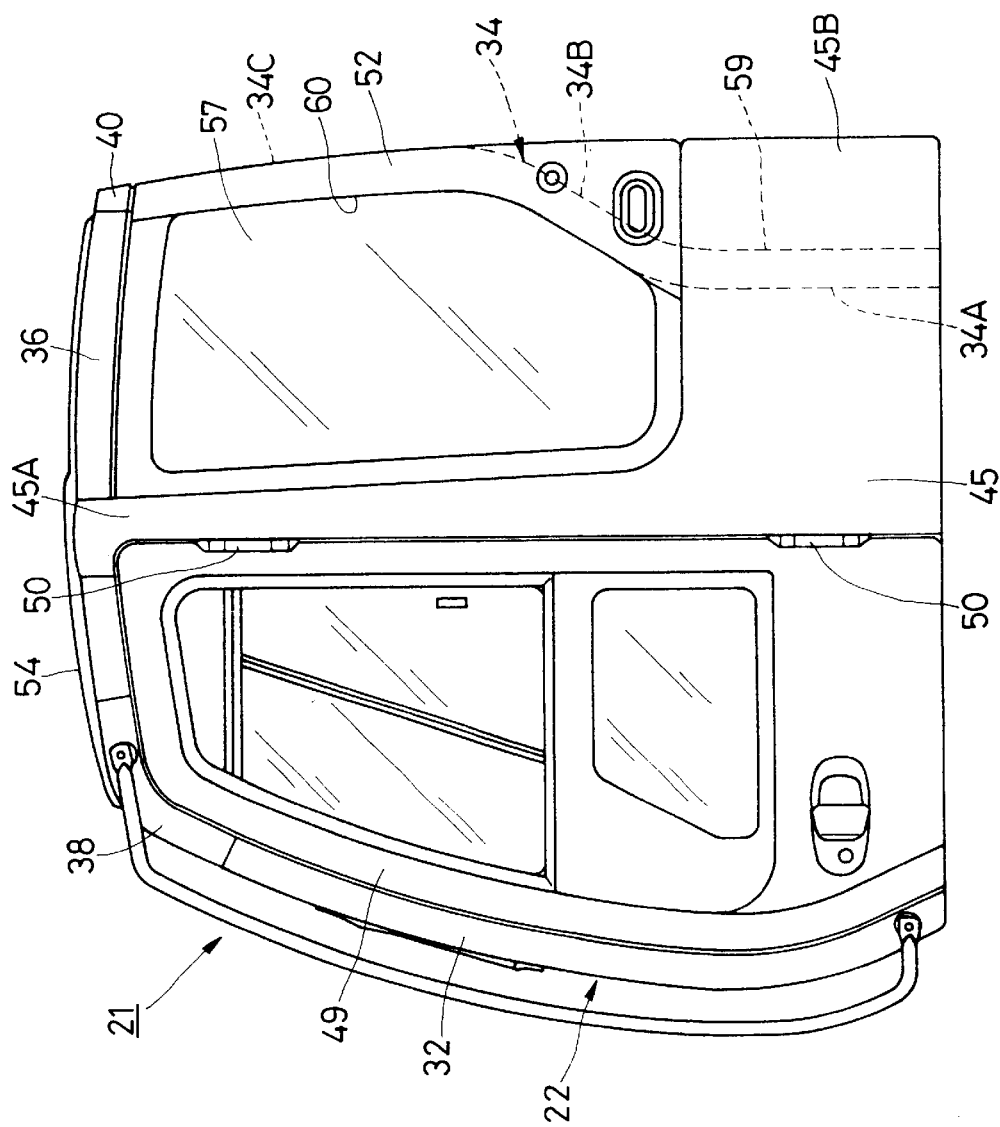
FIG. 5 is a front view of the cab shown in FIG. 1.

Denoted at 21 is a cab which is mounted on a left front portion of the revolving frame 4. The cab 21 internally defines an operating room to be occupied by an operator of the machine, and an operator's seat as well as various operating and control levers (both not shown) are provided in the operating room. As seen in FIGS. 4 and 5, the cab 21 is largely constituted by a cab frame 22, a front window 48, a door 49 and a rear panel 51, which will be described hereinafter.

Figure 6:
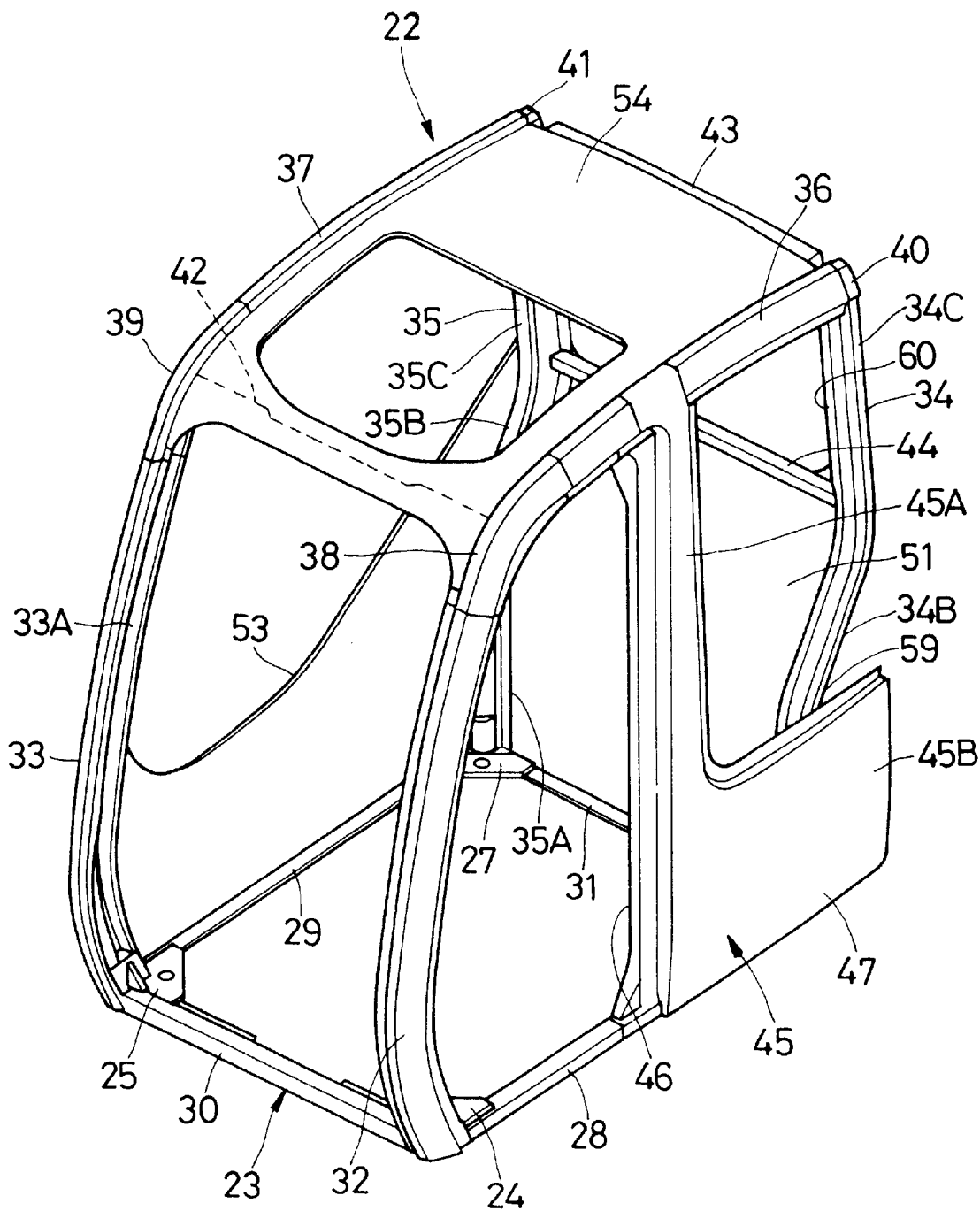
FIG. 6 is a perspective view of a cab frame, taken from the front side.
Figure 7:
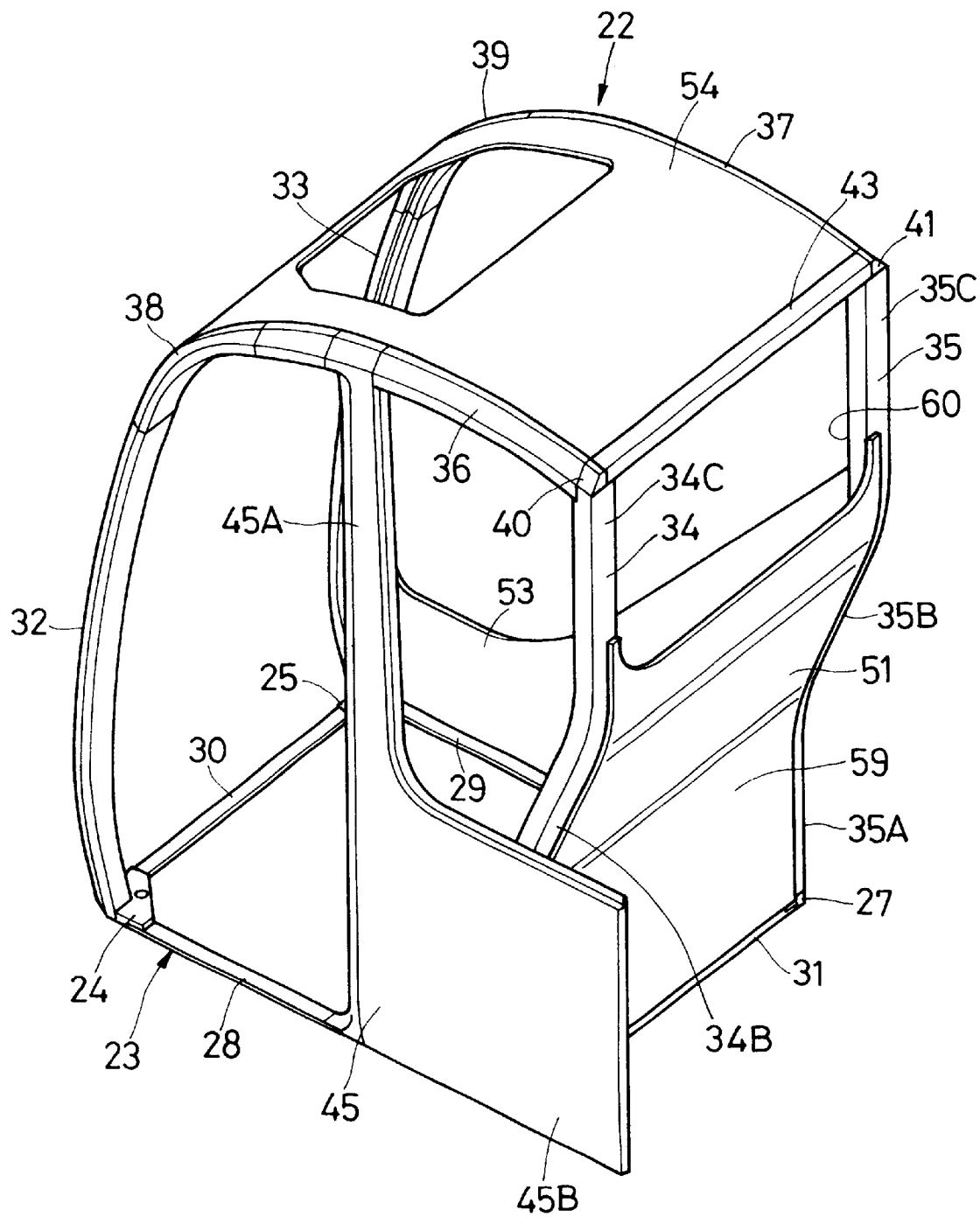
FIG. 7 is a perspective view of the same cab frame, taken from the rear side.
Figure 8:
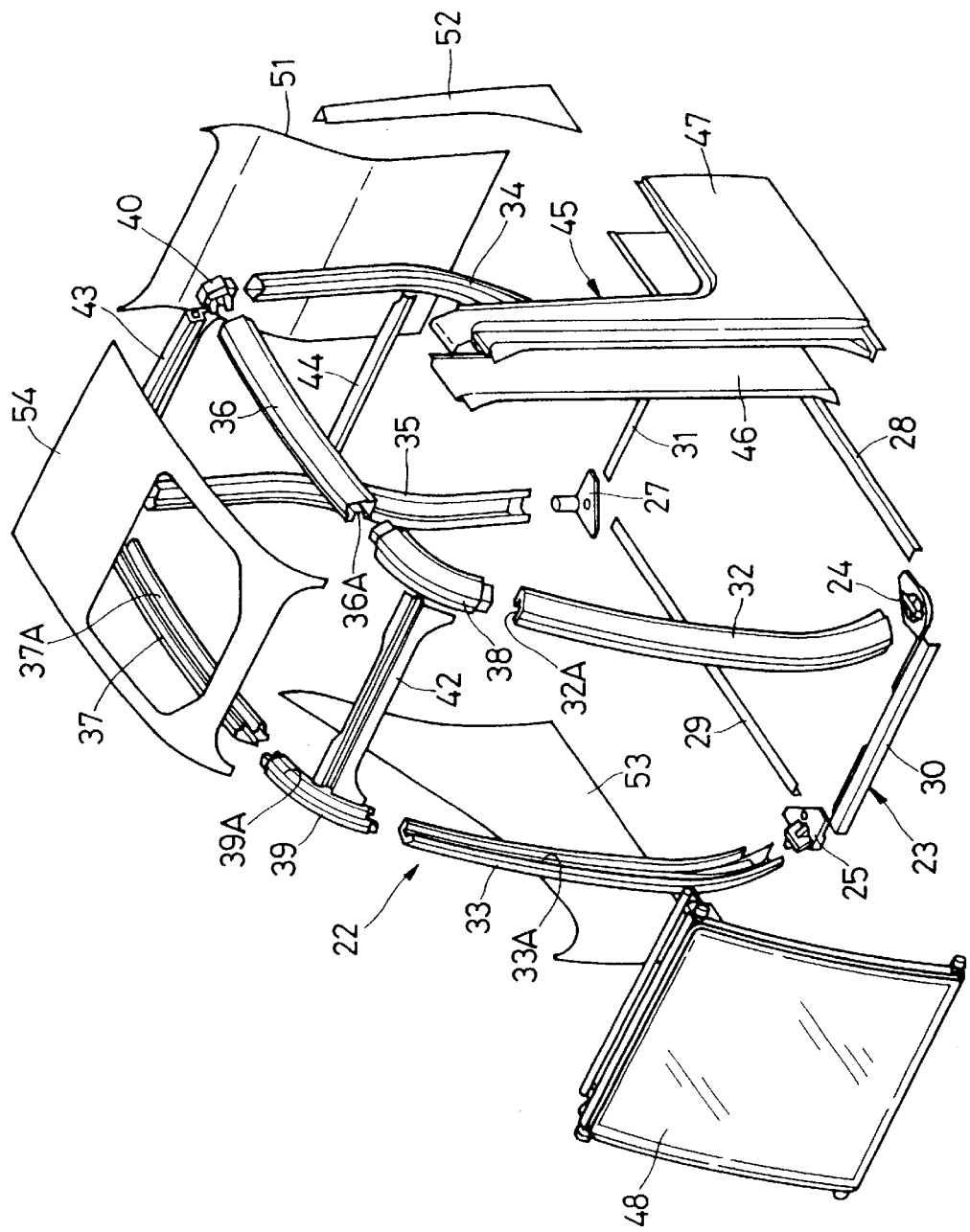
FIG. 8 is an exploded view of the cab frame.

Indicated at 22 is a cab frame which forms a bone structure of the cab 21. As shown in FIGS. 6 to 8, the cab frame 22 is constituted by a base frame 23, front pillars 32 and 33, rear pillars 34 and 35, roof pillars 36 and 37, a front tie frame 42, a rear tie frame 43 and a center pillar 45.

Figure 9:
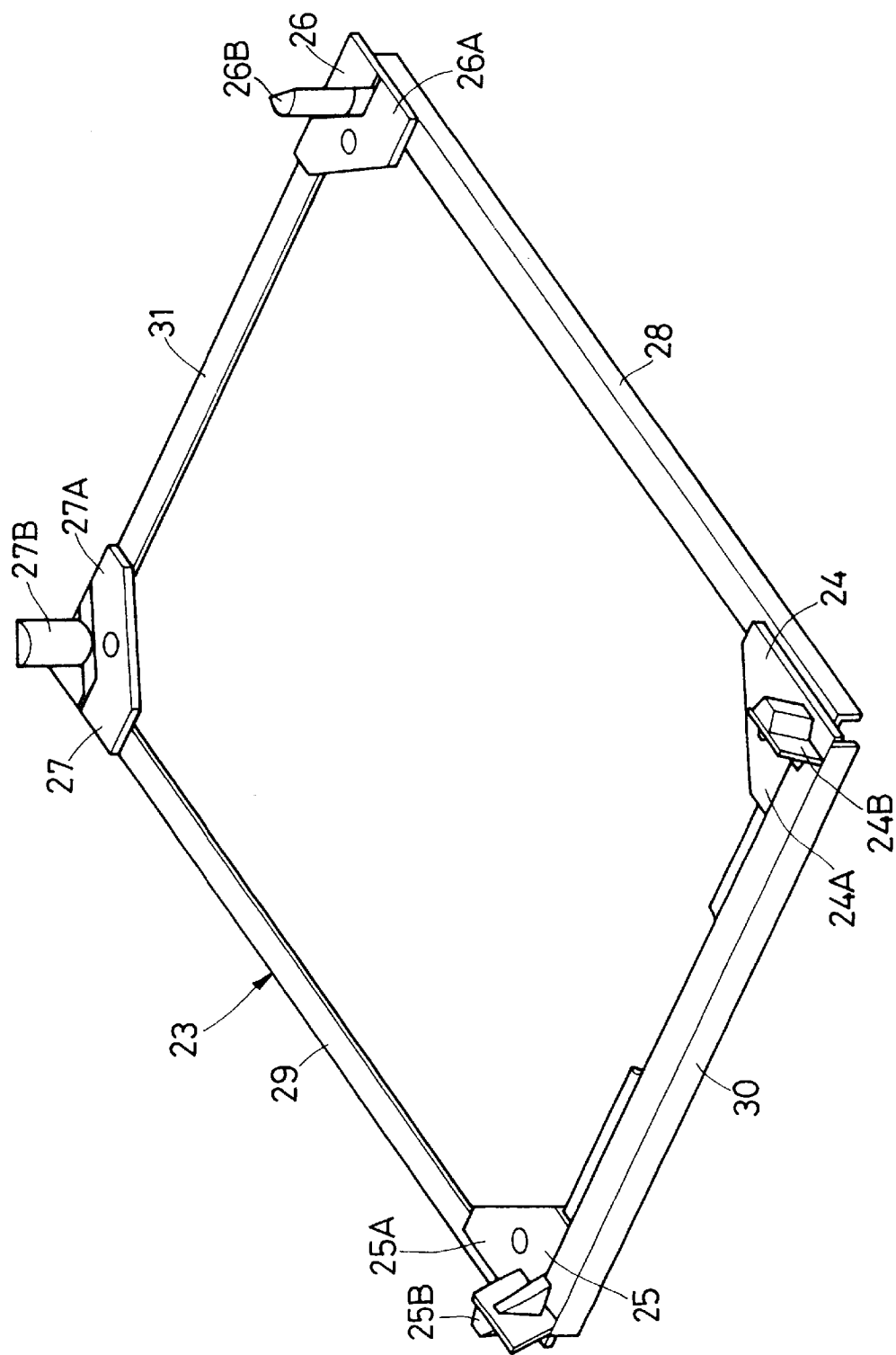
FIG. 9 is an enlarged perspective view of a base frame alone.

Designated at 23 is a base frame which forms a base of the cab 21. As shown in FIG. 9, the base frame 23 includes four mount bases 24 to 27 which are located at four corner portions, namely, at left front, right front, left rear and right rear corners, respectively, and four base link frames 28 to 31, namely, left and right base link frames 28 and 29 which connect the mount bases 24 and 25 with mount bases 26 and 27, respectively, and front and rear base link frames 30 and 31 which connect the mount bases 24 and 26 with mount bases 25 and 27, respectively.

In this instance, the front mount bases 24 and 25 are composed of base plates 24A and 25A substantially of a triangular shape, and fitting projections 24B and 25B which are projected upward from the base plates 24A and 25A, respectively. On the other hand, the rear mount bases 26 and 27 are composed of base plates 26A and 27A substantially of a triangular shape, and fitting projections 26B and 27B of a semi-circular shape in section which are projected upward from the base plates 26A and 27A, respectively.

The left base link frame 28 is connected to the base plates 24A and 26A of the left front mount base 24 and the left rear mount base 26, while the right base link frame 29 is connected to the base plates 25A and 27A of the right front mount base 25 and the right rear mount base 27. On the other hand, the front base link frame 30 is connected to the base plates 24A and 25A of the left front mount base 24 and the right front mount base 25, while the rear base link frame 31 is connected to the base-plates 26A and 27A of the left rear mount base 26 and the right rear mount base 27. Each one of the base link frames 28 to 31 is by longitudinally folding a plate into L-shape in section.

Indicated at 32 is a left front pillar which is located in a left corner and at a position on the front side of the base frame 23, and at 33 is a right front pillar which is located in a right corner portion and at a position on the front side of the base frame 23. In this instance, the left front pillar 32 and the right front pillar 33 are each constituted by a steel pipe of a diversified shape and in a forwardly convex profile, and each pillars 32 and 33 are formed, for example, by drawing an ordinary round steel pipe into a specific sectional shape. Further, each one of the front pillars 32 and 33 is integrally formed with roller grooves 32A and 33A (see FIG. 8 for the roller groove 32A) on a transversely inner side for guiding a front window 48 when the latter is fitted between the two front pillars 32 and 33.

The lower end of the left front pillar 32, which is arranged in the above-described manner, is fitted on the fitting projection 24B of the left front mount base 24 and securely fixed to the latter by welding or other suitable means. Similarly, the lower end of the right front pillar 33 is fitted on the fitting projection 25B of the right front mount base 25 and securely fixed to the latter by welding or other suitable means.

Figure 10:
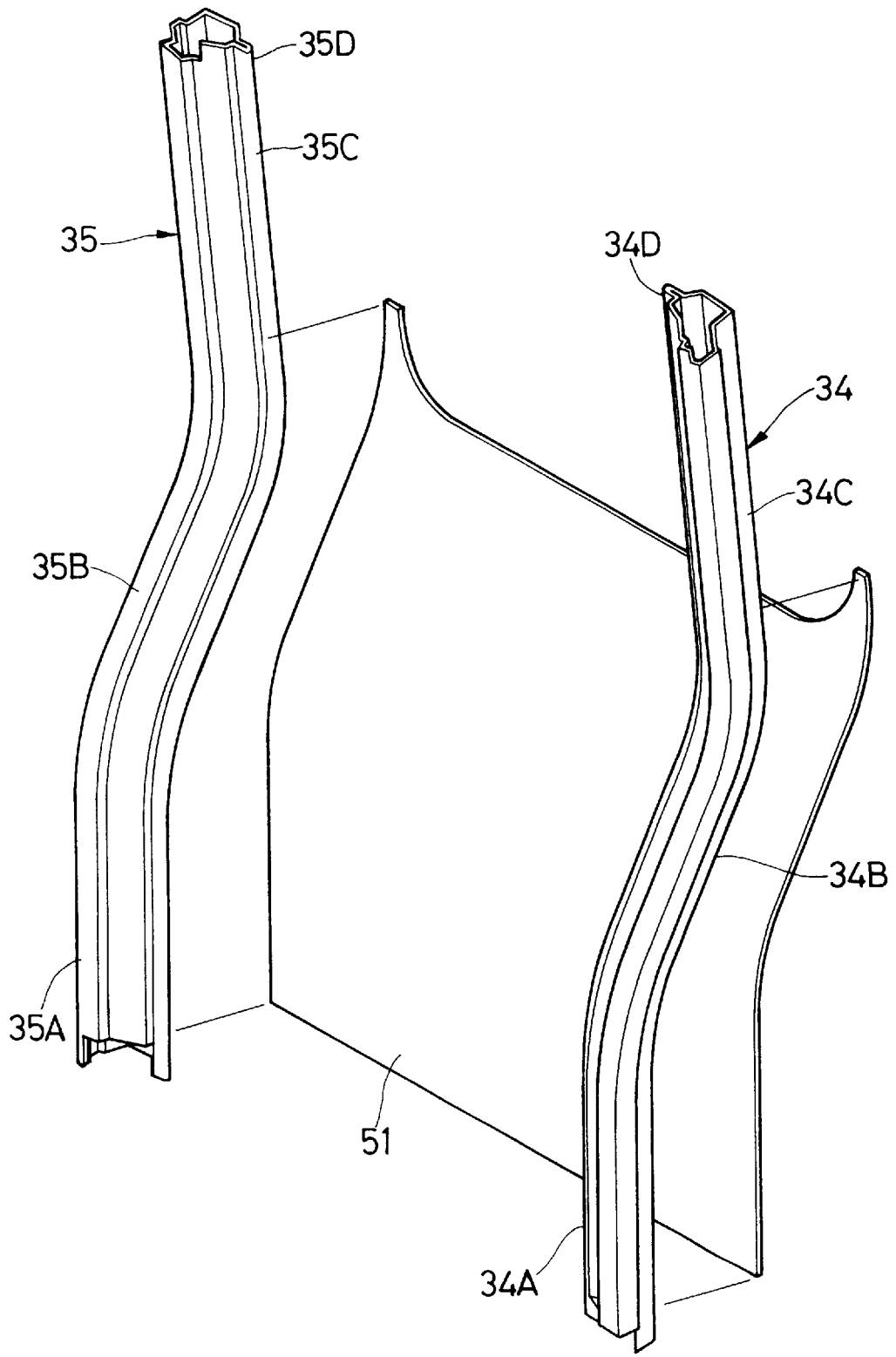
FIG. 10 is an exploded perspective view on an enlarged scale of left and right rear pillars, and rear panel.

On the other hand, indicated at 34 is a left rear pillar which is located in a left corner at the rear end of the base frame 23, and at 35 is a right rear pillar which is located in a right corner at the rear end of the base frame 23. In this instance, as shown in FIGS. 4 and 10 the left rear pillar 34 is largely constituted by a lower pillar portion 34A which is erected on the base frame 23, an intermediate pillar portion 34B which is extended upward from the upper end of the lower pillar portion 34A and at the same time inclined rearward to form an angularly bent portion, and an upper pillar portion 34C which is extended upward from the upper distal end of the intermediate pillar portion 34B. Similarly, the right rear pillar 35 is largely constituted by an upright lower pillar portion 35A which is erected on the base frame 23, an intermediate pillar portion 35B which is extended upward from the upper end of the lower pillar portion 35A and at the same time inclined rearward to form an angularly bent portion, and an upright upper pillar portion 35C which is extended upward from the upper distal end of the intermediate pillar portion 35B.

In the manner as described above, at a vertically intermediate position, the rear pillars 34 and 35 are each bent in the rearward direction by way of the intermediate pillar portion 34B and 35B. That is to say, the hollow steel pipes which constitute the rear pillars 34 and 35 are each formed in a staggered shape as a whole, having the lower pillar portion 34A and 35A and the upper pillar portions 34C and 35C located forward and rearward of the intermediate pillar portion 34B and 35B, respectively. Thus, by way of the rear pillars 34 and 35 of a staggered shape, a lower section of the rear end of the cab 21 (cab frame 22) is receded in the forward direction to provide a recessed space 59 which contributes to expand a machine room to be provided outside the cab 21 as will be described in greater detail hereinafter. An upper section at the rear end of the cab 21 is bulged out in the rearward direction to form a rear expansion space 60 which contributes to expand the dwelling room within the cab 21.

Further, similarly to the front pillars 32 and 33, the right and left rear pillars 35 and 34 are each constituted by a steel pipe of a diversified shape, substantially square in section, which is obtained by drawing an ordinary round steel pipe. As shown in FIG. 10, the rear pillars 34 and 35 are each integrally formed with a window pane fitting protuberance 34D and 35D which is extended vertically from upper to lower end on a transversely inner side of each rear pillar 34 and 35 for fitting a pane of rear window glass 56, which will be described hereinafter.

The lower end of the left rear pillar 34 is fitted on the fitting projection 26B of the left rear mount base 26 and securely fixed to the latter by welding or other suitable means. Similarly, the lower end of the right rear pillar 35 is fitted on the fitting projection 27B of the right rear mount base 27 and securely fixed to the latter by welding or other suitable means.

Indicated at 36 is a left roof pillar which is extending to upper end portions of the left front pillar 32 and the left rear pillar 34, and at 37 is a right roof pillar which is extending to upper end portions of the right front pillar 33 and the right rear pillar 35. In this instance, each one of the left and right roof pillars 36 and 37 is constituted by a steel pipe of a diversified shape similar to the ones of the above-described left and right front pillars 32 and 33, and moderately bent or curved to present an upwardly convex shape. Further, the left and right roof pillars 36 and 37 are each integrally formed with roller groove 36A and 37A (see FIG. 8 for the roller groove 36A) on a transversely inner side for guiding a front window 48 therealong.

Furthermore, the fore end of the left roof pillar 36 is connected to an upper end portion of the left front pillar 32 through a left front joint member 38, which will be described hereinafter, while its rear end is connected to an upper end portion of the left rear pillar 34 through a left rear joint member 40. On the other hand, the fore end of the right roof pillar 37 is connected to an upper end portion of the right front pillar 33 through a right front joint member 39, while its rear end is connected an upper end portion of the right rear pillar 35 through a right rear joint member 41.

Designated at 38 is the left front joint member which is provided between the left front pillar 32 and the left roof pillar 36, and at 39 is the right front joint member which is provided between the right front pillar 33 and the right roof pillar 37. The left and right front joint members 38 and 39 are each in the form of an arcuately curved square pipe. In this instance, as shown in FIGS. 4 and 8, the respective front joint members 38 and 39 are formed with roller grooves 38A and 39A (of which the roller groove 38A is not shown in the drawings) contiguously to and from the roller grooves 32A and 33A on the front pillars 32 and 33 and the roller grooves 36A and 37A on the roof pillars 36 and 37, respectively.

One end of the left front joint member 38 is fitted in an upper end portion of the left front pillar 32 and securely fixed to the latter by welding or other suitable means, while the other end is fitted in a fore end portion of the left roof pillar 36 and securely fixed to the latter by welding or other suitable means. Thus, the left front pillar 32 is connected to the left roof pillar 36 through the left front joint member 38. On the other hand, one end of the right front joint member 39 is fitted in an upper end portion of the right front pillar 33 and securely fixed to the latter by welding or other suitable means, while the other end is fitted in a fore end portion of the right roof pillar 37 and securely fixed to the latter by welding or other suitable means. Thus, similarly the right front pillar 33 is connected to the right roof pillar 37 through the right front joint member 39.

Now, indicated at 40 is a left rear joint member which is provided between the left rear pillar 34 and the left roof pillar 36, and at 41 is a right rear joint member which is provided between the right rear pillar 35 and the right roof pillar 37. These left and right rear joint members 40 and 41 are each formed in a hollow box-like shape.

On the front side, the left rear joint member 40 is fitted in a rear end portion of the left roof pillar 36 and securely fixed to the latter by welding or other suitable means, and, on the lower side, it is fitted in an upper end portion of the left rear pillar 34 and securely fixed to the latter by welding or other suitable means to connect the left rear pillar 34 to the left roof pillar 36. Similarly, on the front side, the right rear joint member 41 is fitted in a rear end portion of the right roof pillar 37 and securely fixed to the latter by welding or other suitable means, and, on the lower side, it is fitted in an upper end portion of the right rear pillar 35 and securely fixed to the latter by welding or other suitable means to connect the right rear pillar 35 to the right roof pillar 37.

Indicated at 42 is a front tie frame (see FIG. 8) which is provided in an upper portion at the front end of the cab frame 22. This front tie frame 42 is constituted by an elongated plate member which extends in the transverse direction. Opposite joint end portions of the front tie frame 42 are securely fixed to the left and right front joint members 38 and 39 by welding. Thus, upper portions of the two front pillars 32 and 33 transversely connected with each other through the front joint member 38 and 39.

Denoted at 43 is a rear tie frame which is provided in an upper portion at the rear end of the cab frame 22. This rear tie frame 43 is constituted, for example, by an elongated square pipe which extends in the transverse direction. Opposite joint ends of the rear tie frame 43 are securely fixed to the left and right rear joint members 40 and 41 by welding. Thus, upper portions of the two rear pillars 34 and 35 are transversely connected with each other through the rear joint members 40 and 41.

Indicated at 44 is an intermediate rear tie frame which is provided at the rear end of the cab frame 22, and located at a position on the lower side of the rear tie frame 43 and in spaced relation with the latter. The transversely extending intermediate rear tie frame 44 is formed by folding an elongated plate into a rod-like shape. Further, opposite ends of the intermediate rear tie frame 44 are securely fixed to the left and right rear pillars 34 and 35 by welding or other suitable means. Thus, intermediate portions of the rear pillars 34 and 35 are transversely connected through the intermediate rear tie frame 44.

Indicated at 45 is a center pillar which is provided at the left side of the cab frame 22. The center pillar 45 is constituted by a hollow structure which is formed by welding together an inner panel 46 and an outer panel 47 which are each pressed substantially in L-shape. Further, the center pillar 45 is composed of a vertically extending pillar section 45A, and a side panel section 45B which is provided continuously from and integrally with lower end of the pillar section 45A.

In this instance, the side panel section 45B is constituted by a hollow structure of a rectangular shape, which is extended rearward from the lower end of the pillar section 45A. More specifically, the side panel section 45B is extended further rearward of the lower pillar portion 34A of the left rear pillar 34 to shield the left side of a recessed space 59 which is provided on the back side of the lower pillar portion 45A (or cab 21) as will be described in greater detail hereinafter.

The pillar section 45A of the center pillar 45, which is arranged in the above-described manner, is located in an intermediate position between the fore and rear ends of the cab. Lower ends of the pillar section 45A and the side panel section 45B are securely fixed to the left base link frame 28 of the base frame 23 by welding or other suitable means, and upper end of the pillar section 45A is securely fixed to the left roof pillar 36 similarly by welding or other suitable means.

Indicated at 48 is a front window which is provided at the fore end of the cab frame 22. The front window 48 is movable to and from an open position and a closed position along the roller grooves 32A and 33A on the respective front pillars 32 and 33, roller grooves 36A and 37A of the respective roof pillars 36 and 37, and roller grooves 38A and 39A (of which the roller groove 38A is not shown in the drawings) on the front joint members 38 and 39. Normally, the front window 48 is in a closed position between the left and right front pillars 32 and 33 to shield the front side of the cab. On the other hand, when lifted up into an open position, it is accommodated between the left and right roof pillars 36 and 37, namely, under the roof panel 54 which will be described hereinafter.

Denoted at 49 is a door which is provided between the center pillar 45 and the left front pillar 32. As shown in FIG. 5, the door 49 is pivotally connected to the center pillar 45 by means of hinges 50.

Indicated at 51 is a rear panel which is formed of metal sheet and fitted between the left and right rear pillars 34 and 35 in such a way as to cover the rear side of the cab frame 22. Further, the upper end of the rear panel 51 is inclined in the rearward direction along and in conformity with the inclined profile of the rear pillars. Marginal edges at the transversely opposite ends of the rear panel 51 are securely fixed to the window pane fitting protuberances 34D and 35D of the left and right rear pillars 34 and 35 by welding or other suitable means.

Indicated at 52 is a corner panel which is formed of metal sheet and the corner panel 52 is fitted on the left rear pillar 34 in such a way as to cover the latter. Designated at 53 is a side panel which is formed of metal sheet and the side panel 53 is securely fixed to the right base link frame 29, right front pillar 33 and right rear pillar 35 in such a way as to cover the right side of the cab frame 22. Indicated at 54 is a roof panel which is formed of metal sheet and the roof panel 54 is securely fixed to the left and right roof pillars 36 and 37, front tie frame 42 and rear tie frame 43.

Further, indicated at 55 is lower front window glass which is fitted under the front window 48 and the lower front window glass 55 is fixedly retained in position by the front base link frame 30 and the left and right front pillars 32 and 33. Indicated at 56 is rear window glass which is fitted between the rear tie frame 43 and the rear panel 51 and the rear window glass 56 is fixedly retained in position by the left and right rear pillars 34 and 35. Indicated at 57 is left side window glass which is fitted between the center pillar 45 and the corner panel 52, and at 58 is right side window glass which is fitted between the right front pillar 33 and the right rear pillar 35.

In this instance, the rear window glass 56 is fitted in position by way of the window pane fitting protuberances 34D and 35D on the left and right rear pillars 34 and 35 and by the use of an annular rubber member (not shown). Thus, the rear window glass 56 can be fitted on the cab frame 22 in a facilitated manner.

Now, indicated at 59 is a recessed space which is formed in a lower portion at the rear end of the cab 21 (or cab frame 22) by the left and right rear pillars 34 and 35 in such a way as to expand a machine room to be provided outside the cab 21. In this instance, the recessed space 59 is formed by the lower pillar portions 34A and 35A positions of which are shifted in the forward direction by the inclined intermediate pillar portions 34B and 35B. Consequently, as shown in FIG. 4, the recessed space 59 can accommodate front portions of the rear cover section 15, namely, front portions of the engine 6, radiator 8, oil cooler 9 and intake hose 10A.

Further, indicated at 60 is a rear expansion space which is formed in an upper portion at the rear end of the cab 21 by the left and right rear pillars 34 and 35 to expand a dwelling room within the cab 21. In this instance, the rear expansion space 60 is formed by the upper pillar portions 34C and 35C positions of which are shifted in the rearward direction by the inclined intermediate pillar portions 34B and 35B. Thus, the rear expansion space 60 is projected out over the rear cover section 15 of the outer shield cover 14 to expand the dwelling room within the cab 21 for providing an operator with a more comfortable dwelling room.

The hydraulic excavator according to the present embodiment, with the above-described arrangements, is operated in the manner as follows.

At a working site, for example, firstly a vehicular drive lever is manually turned into a forward or reverse position by an operator in the cab 21 to drive the lower structure 1 in a forward or reverse direction. In the case of a ground excavating operation, working mechanism control levers are operated to work the working mechanism 3 and to rotate the upper structure 2.

The cab 21 is assembled in the order as follows. In the first place, lower ends of the front pillars 32 and 33 are attached to the mount bases 24 and 25 of the base frame 23, and lower ends of the rear pillars 34 and 35 are attached to the mount bases 26 and 27. In the next place, fore ends of the roof pillars 36 and 37 are attached to the upper ends of the front pillars 32 and 33 through the front joint members 38 and 39. Then, rear ends of the roof pillars 36 and 37 are attached to the upper ends of the rear pillars 34 and 35 through the rear joint members 40 and 41. Nextly, the front joint members 38 and 39 are connected to each other by the front tie frame 42, and the rear joint members 40 and 41 are connected to each other by the rear tie frame 43. Then, the intermediate tie frame 44 is connected to vertically intermediate portions of the rear pillars 34 and 35. Further, the center pillar 45 is attached to the left base link frame 28 of the base frame 23 and the left roof pillar 36. Now, assembling of the cab frame 22 is complete.

After assembling the cab frame 22 in the manner as described above, the front window 48, door 49, rear panel 51, corner panel 52, side panel 53, roof panel 54, lower front window glass 55, rear window glass 56, left side window glass 57 and right side window glass 58 are successively mounted or fitted on the cab frame 22 to assemble the cab 21.

The assembled cab 21 is mounted on a left front portion of the revolving frame 4 through damper mounts or the like (not shown). At this time, since the recessed space 59 is formed in a lower portion at the rear end of the cab 21 by the rear pillars 34 and 35 in such a way as to expand an external machine room, it becomes possible to accommodate in the recessed space 59 fore end portions of the rear cover section 15, namely, front portions of the engine 6, radiator 8, oil cooler 9 and intake hose 10A to reduce the length from the cab 21 to the counterweight.

Further, the rear expansion space 60 is formed in an upper portion at the rear end of the cab 21 by the rear pillars 34 and 35 to expand the dwelling room. Namely, a broader dwelling room is provided within the cab 21 by the rear expansion space 60.

Thus, according to the present embodiment, the left and right rear pillars 34 and 35 are each constituted by a steel pipe of a diversified sectional shape, which is bent into a staggered shape having the respective lower and upper pillar portions shifted in the forward and backward directions from the inclined intermediate pillar portion 34B or 35B. Therefore, the recessed space 59 is provided in a lower portion at the back side of the cab, on the lower side of the intermediate pillar portions 34B and 35B of the left and right rear pillars 34 and 35. On the upper side of the intermediate pillar portions 34B and 35B, the cab is projected out in the rearward direction to provide the rear expansion space 60.

Thus, the recessed space 59 can accommodate front portions of the engine 6, radiator 8, oil cooler 9 and intake hose 10A in the machine room and can contribute to downsize the upper structure 2 by reducing the length from the cab 21 to the counterweight. In addition, the rear expansion space 60 contributes to improve the amenity of the dwelling room in the cab 21 by expanding the dwelling room.

Despite complication in shape to provide the recessed space 59 and the rear expansion space 60, the left and right rear pillars 34 and 35 which have the upper and lower pillar portions staggered in the forward and rearward directions can be fabricated easily and at low cost by the use of steel pipes of diversified shape, making it possible to improve productivity and to reduce production cost.

Further, since the rear panel 51 is shaped in conformity with the curved profile of the rear pillars 34 and 35, the recessed space 59 can be formed by the rear panel 51 in cooperation with the rear pillars 34 and 35 as soon as the rear panel 51 is welded to the latter.

Furthermore, the left and right rear pillars 34 and 35 are each formed by the use of a steel pipe of a diversified sectional shape, i.e., a steel pipe of substantially square shape in section which is obtained by drawing an ordinary round steel pipe and bending same into a staggered shape. Therefore, although superficially complicate in shape, each one of the rear pillars 34 and 35 can be formed very easily.

Moreover, the cab frame 22 is provided with the center pillar 45 to connect the left base link frame 28 of the base frame 23 and the left roof pillar 36, at an intermediate position between its fore and rear ends, and the center pillar 45 is integrally provided with the side panel section 45B which is extended to the rear side in such a way as to cover up the recessed space 59. Therefore, the center pillar 45 contributes to enhance the strength of the base frame 23 and the roof pillar 36. In addition, the side panel section 45B which covers up the recessed space 59 to improve the appearance of the cab 21.

On the other hand, the left and right rear pillars 34 and 35 are each integrally formed with a longitudinally extending, window pane fitting protuberance 34D or 35D on the transversely inner side. Therefore, by the use of the window pane fitting protuberances 34D and 35D, rear window glass 56 can be fitted in position easily in an efficient manner during assembling work.

Figure 11:
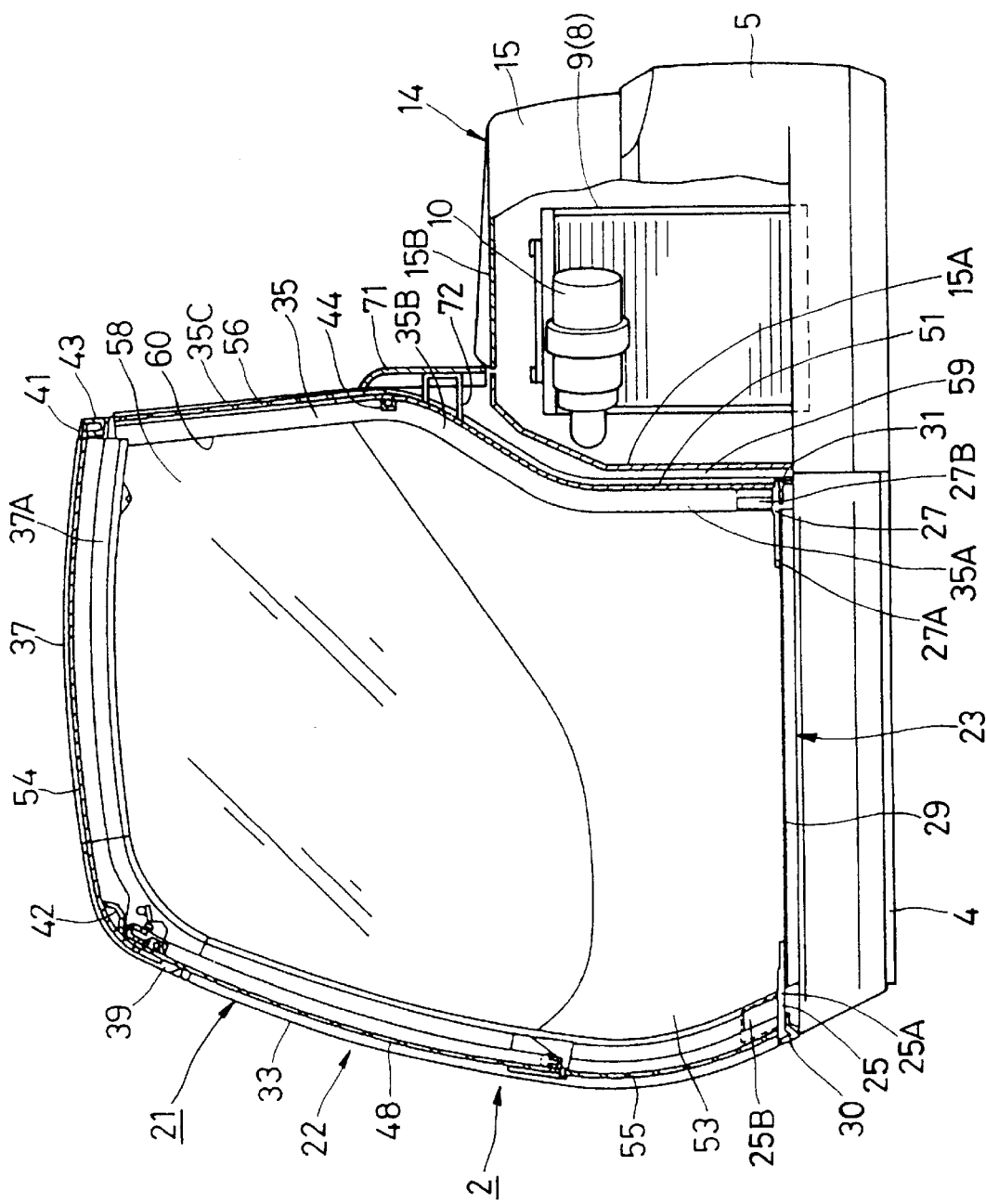
FIG. 11 is a sectional view of a cab applied to a hydraulic excavator as a second embodiment of the present invention, taken from the same position as FIG. 4, showing outer shield cover and design cover of the cab.
Figure 12:
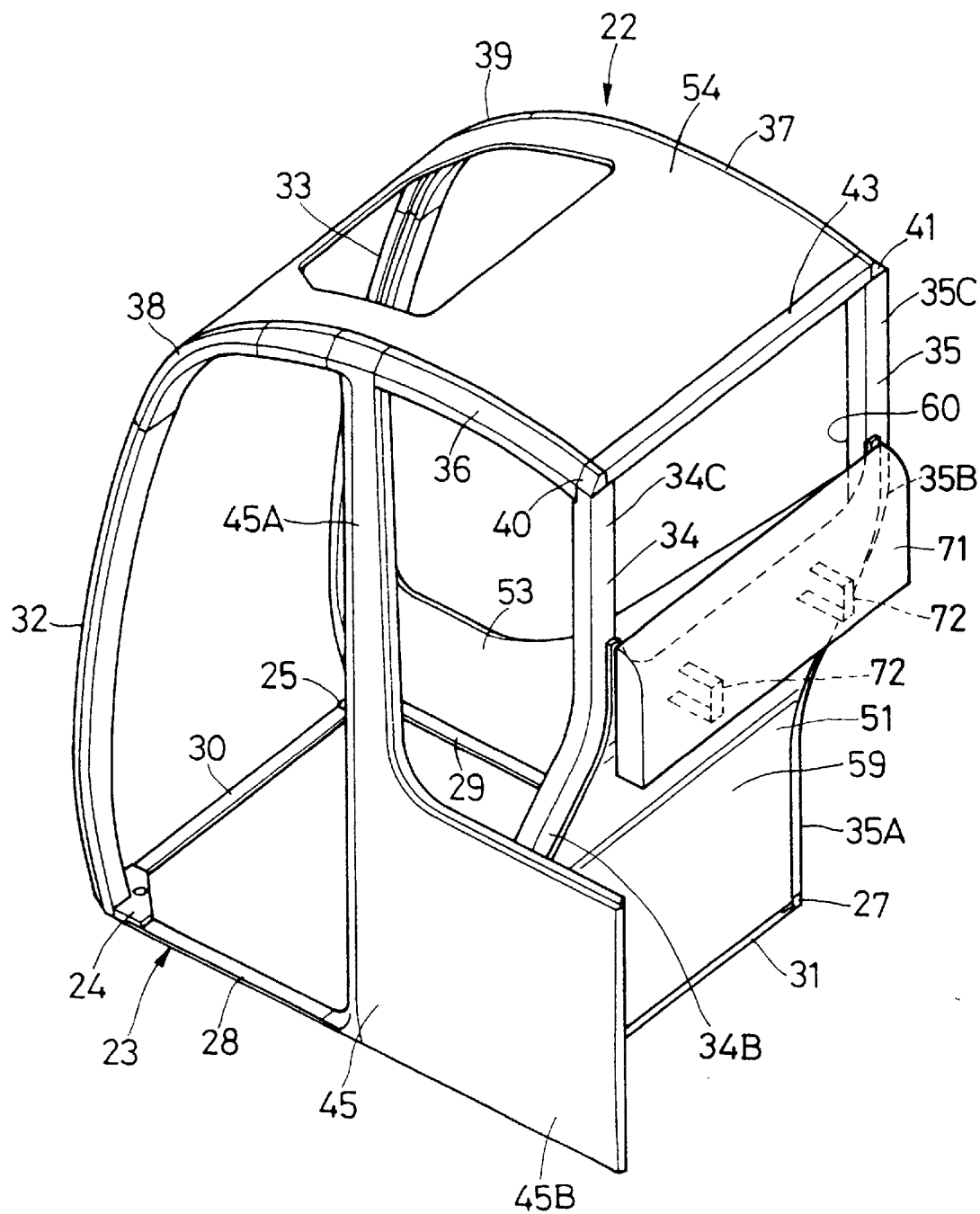
FIG. 12 is a perspective view of cab frame and design cover, taken from the rear side.

Now, turning to FIGS. 11 and 12, there is shown a second embodiment of the present invention. This embodiment has features in that a design cover is provided on the rear side of the rear panel to cover up the top side of the recessed space. In the following description of the second embodiment, those component parts which are common with the foregoing first embodiment are simply designated by common reference numerals to avoid repetitions of same explanations.

Indicated at 71 is a design cover which is provided on the back side of the rear panel 51 to cover up the top side of the recessed space 59. As shown in FIG. 12, the design cover 71 is constituted by a metal plate which is extended in the transverse direction and which has marginal edge portions folded and tucked in along its upper side and at its transversely opposite ends. This design cover 71 is fixed to the rear panel 51 by way of a couple of angle members 72 at transversely spaced positions to cover up the top side of the recessed space 59 which opens up between the outer shield cover 14 and the cab frame 22.

Thus, according to the present embodiment, the upper side of the recessed space 59 which opens up between the outer shield cover 14 and the cab frame 22 is covered up by the design cover 71, which is provided at the back side of the rear panel 51, to improve the appearance of the cab 21.

Figure 13:
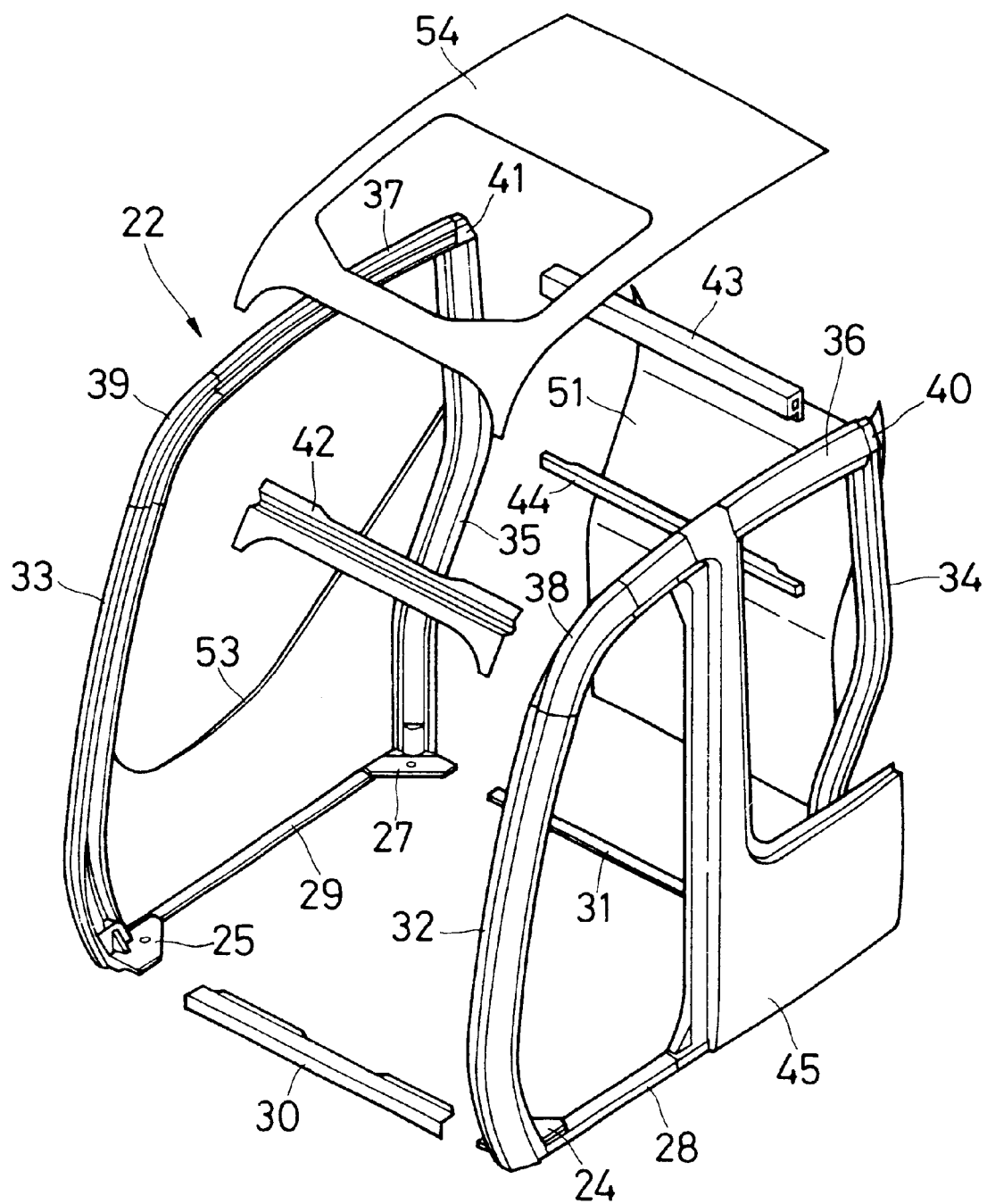
FIG. 13 is an exploded perspective view of a cab frame in a modification according to the present invention, showing the order of cab assembling steps.

In the foregoing embodiments, in assembling the cab 21, the description has been directed by way of example to a case where the base frame 23 is firstly formed by the mount bases 24 to 27 and the base link frames 28 to 31 and then the front pillars 32 and 33 and the rear pillars 34 and 35 are attached to the base frame 23. However, the present embodiment is not limited to the particular example given. For example, the cab can be assembled in the manner as in a modification shown in FIG. 13. Namely, in this case, a left section of the cab 21 is assembled by the use of the left side members including the mount bases 24 and 26, base link frame 28, front pillar 32, rear pillar 34, roof pillar 36 and center pillar 45, separately from a right section of the cab 21 which is assembled by the use of right side members including mount bases 25 and 27, base link frame 29, front pillar 33, rear pillar 35 and roof pillar 37. After assembling the left and right sections, the resulting assemblies are connected to each other by the use of the base link frames 30 and 31, front tie frame 42, rear tie frame 43 and 44, rear panel 51 and roof panel 54.

Further, in the foregoing embodiments, there has been shown a case in which the front pillars 32 and 33 and the roof pillars 36 and 37 are connected to each other through the front joint members 38 and 39, respectively, and the rear pillars 34 and 35 and the roof pillars 36 and 37 are connected to each other through the rear joint members 40 and 41, respectively. However, the present invention is not limited to the particular arrangements shown. For example, front and rear pillars may be directly connected to the roof pillars by welding or other suitable means.

Furthermore, in the foregoing embodiments, the construction machine cab has been described by way of the cab 21 of a hydraulic excavator. However, it is to be understood that the present invention can be similarly applied to hydraulic cranes or other construction machines.

INDUSTRIAL APPLICABILITY

As clear from the foregoing particular description, according to the present invention, left and right rear pillars are each constituted by a hollow steel pipe of a staggered shape having positions of lower and upper pillar portions shifted in the forward and rearward directions by an inclined intermediate pillar portion to provide a recessed space between the lower pillar portions to expand an external machine room, while providing a rear expansion space between the upper pillar portions to expand an internal dwelling room of the cab. The rear pillars of a complicate staggered shape, with a lower pillar portion positioned forward of an upper pillar portion, can be formed easily by bending an intermediate portion of a hollow steel pipe and at a low cost. Therefore, they even contribute to improve productivity and to cut production cost of the cab.

Further, an external machine room can be expanded by the recessed space which is formed between the lower portions of the rear pillars. Therefore, in a case where the cab is applied to a hydraulic excavator, part of equipments such as engine and heat exchanger can be accommodated in the recessed space to reduce the length from the cab to the counterweight, that is to say, to downsize the upper structure of the excavator. Besides, the dwelling room within the cab is expanded by the rear expansion space, which is provided between the upper portions of the rear pillars, to improve the amenity of the cab.

What is claimed is:

1. A cab for construction machines, including: mount bases located at four corners; base link frames arranged to connect said mount bases in transverse and longitudinal directions of the machine; left and right front pillars erected on left front and right front mount bases; left and right rear pillars erected on left rear and right rear mount bases; left and right roof pillars disposed in the longitudinal direction and bridged between upper end portions of said left front and rear pillars and said right front and rear pillars, respectively; a front tie frame bridged between upper end portions of said left and right front pillars to connect same in the transverse direction; and a rear tie frame bridged between upper end portions of said left and right rear pillars to connect same in the transverse direction; characterized in that said cab comprises:

said left and right rear pillars are each constituted by a hollow steel pipe of a staggered shape with an inclined intermediate pillar portion between upright lower and upper pillar portions to have positions of said lower and upper pillar portions shifted in the forward and rearward directions, respectively;

a recessed space provided on the lower side of said intermediate pillar portions of said left and right rear pillars to expand an external machine room;

a rear expansion space provided on the upper side of said intermediate pillar portions of said left and right rear pillars to expand an internal dwelling room of said cab; and a center pillar provided at one lateral side of said cab and connected to said base link frame and said roof pillar at an intermediate position between front and rear ends of said cab, said center pillar being integrally provided with a side panel portion extending to the rear side in such a way as to cover up said recessed space.

2. A cab for construction machines as defined in claim 1, wherein said left and right rear pillars are each constituted by said lower pillar portion erected on one of said rear mount bases, said intermediate pillar portion inclined rearwardly from an upper end of said lower pillar portion, and said upper pillar portion extended upright from an upper end of said intermediate pillar potion, said lower, intermediate and upper portions being formed by bending a hollow steel pipe.

3. A cab for construction machines as defined in claim 1, further comprising a rear panel provided between said left and right rear pillars to cover the back side of said cab, said rear panel being formed of a plate shaped in conformity with said staggered shape of said rear pillars.

4. A cab for construction machines as defined in claim 1, wherein said left and right rear pillars are each constituted by a steel pipe of a diversified shape obtained by drawing an ordinary round steel pipe.

5. A cab for construction machines as defined in claim 1, wherein said left and right rear pillars are each provided with a vertically extending window pane fitting protuberance on a transversely inner side for fitting a rear window glass thereon.

6. A cab for construction machines, including: mount bases located at four corners; base link frames arranged to connect said mount bases in transverse and longitudinal directions of the machine; left and right front pillars erected on left front and right front mount bases; left and right rear pillars erected on left rear and right rear mount bases; left and right roof pillars disposed in the longitudinal direction and bridged between upper end portions of said left front and rear pillars and said right front and rear pillars, respectively; a front tie frame bridged between upper end portions of said left and right front pillars to connect same in the transverse direction; and a rear tie frame bridged between upper end portions of said left and right rear pillars to connect same in the transverse direction; characterized in that said cab comprises:

said left and right rear pillars are each constituted by a hollow steel pipe of a staggered shape with an inclined intermediate pillar portion between upright lower and upper pillar portions to have positions of said lower and upper pillar portions shifted in the forward and rearward directions, respectively;

a recessed space is provided on the lower side of said intermediate pillar portions of said left and right rear pillars to expand an external machine room;

a rear expansion space provided on the upper side of said intermediate pillar portions of said left and right rear pillars to expand an internal dwelling room of said cab;

a rear panel provided between said left and right rear pillars to cover the back side of said cab, said rear panel being formed of a plate shaped in conformity with said staggered shape of said rear pillars; and a design cover attached to the back side of said rear panel in such a way as to cover an upper side of said recessed space.

* * * * *